United States Patent
Schlicker et al.

(10) Patent No.: US 9,207,131 B2
(45) Date of Patent: Dec. 8, 2015

(54) METHOD AND APPARATUS FOR LOAD AND ADDITIONAL PROPERTY MEASUREMENT

(71) Applicant: Jentek Sensors, Inc., Waltham, MA (US)

(72) Inventors: Darrell E. Schlicker, Freeland, MI (US); Neil J. Goldfine, Newton, MA (US)

(73) Assignee: Jentek Sensors, Inc., Waltham, MA (US)

( * ) Notice: Subject to any disclaimer, the term of this patent is extended or adjusted under 35 U.S.C. 154(b) by 432 days.

(21) Appl. No.: 13/853,853

(22) Filed: Mar. 29, 2013

(65) Prior Publication Data

US 2013/0269450 A1 Oct. 17, 2013

Related U.S. Application Data

(60) Provisional application No. 61/617,168, filed on Mar. 29, 2012.

(51) Int. Cl.
| | |
|---|---|
| *B25B 23/14* | (2006.01) |
| *G01L 5/24* | (2006.01) |
| *G01L 1/12* | (2006.01) |
| *G01L 1/26* | (2006.01) |

(52) U.S. Cl.
CPC .... *G01L 1/12* (2013.01); *G01L 1/26* (2013.01)

(58) Field of Classification Search
USPC .................................................. 73/862.625
See application file for complete search history.

(56) References Cited

U.S. PATENT DOCUMENTS

| | | | | |
|---|---|---|---|---|
| 6,781,387 | B2 * | 8/2004 | Goldfine et al. | 324/658 |
| 6,992,482 | B2 * | 1/2006 | Shay et al. | 324/235 |
| 7,839,282 | B1 * | 11/2010 | Mathur et al. | 340/562 |
| 8,222,897 | B2 * | 7/2012 | Sheiretov et al. | 324/242 |
| 2006/0076952 | A9 * | 4/2006 | Goldfine et al. | 324/240 |

OTHER PUBLICATIONS

Lewandowski, Janusz, "Inductive Measuring Load Cell," *Metrology and Measurement Systems*, pp. 1-13, Index 330930, ISSN 0860-8229 (2009).

Goldfine, N., et al., "Magnetic Stress Gages for Torque and Load Monitoring in Rotorcroft," Presented at the American Helicopter Society (AHS) 64th Forum, Montreal Canada (Apr. 29-May 1, 2008).

* cited by examiner

*Primary Examiner* — Lisa Caputo
*Assistant Examiner* — Jamel Williams
(74) *Attorney, Agent, or Firm* — Hamilton, Brook, Smith & Reynolds, P.C.

(57) ABSTRACT

A system and method for measuring load and an additional property using a sensor gasket embedded between two components. The sensor gasket may include a sensor layer and a conductive layer. A gap between the sensor layer and conductive layer may be filled with a load sensitive material. The thickness of the load sensitive material varies with the load applied to the two components between which the sensor gasket sits. The sensor operates in a first mode to obtain a sensor measurement that depends on the distance between the sensor layer and conductive layer. The sensor measurement then used to estimate the applied load. The sensor operates in a second mode to estimate a property of one or both of the components. The property of interest may be cracking, material loss due to corrosion, temperature, or another property of the component.

20 Claims, 10 Drawing Sheets

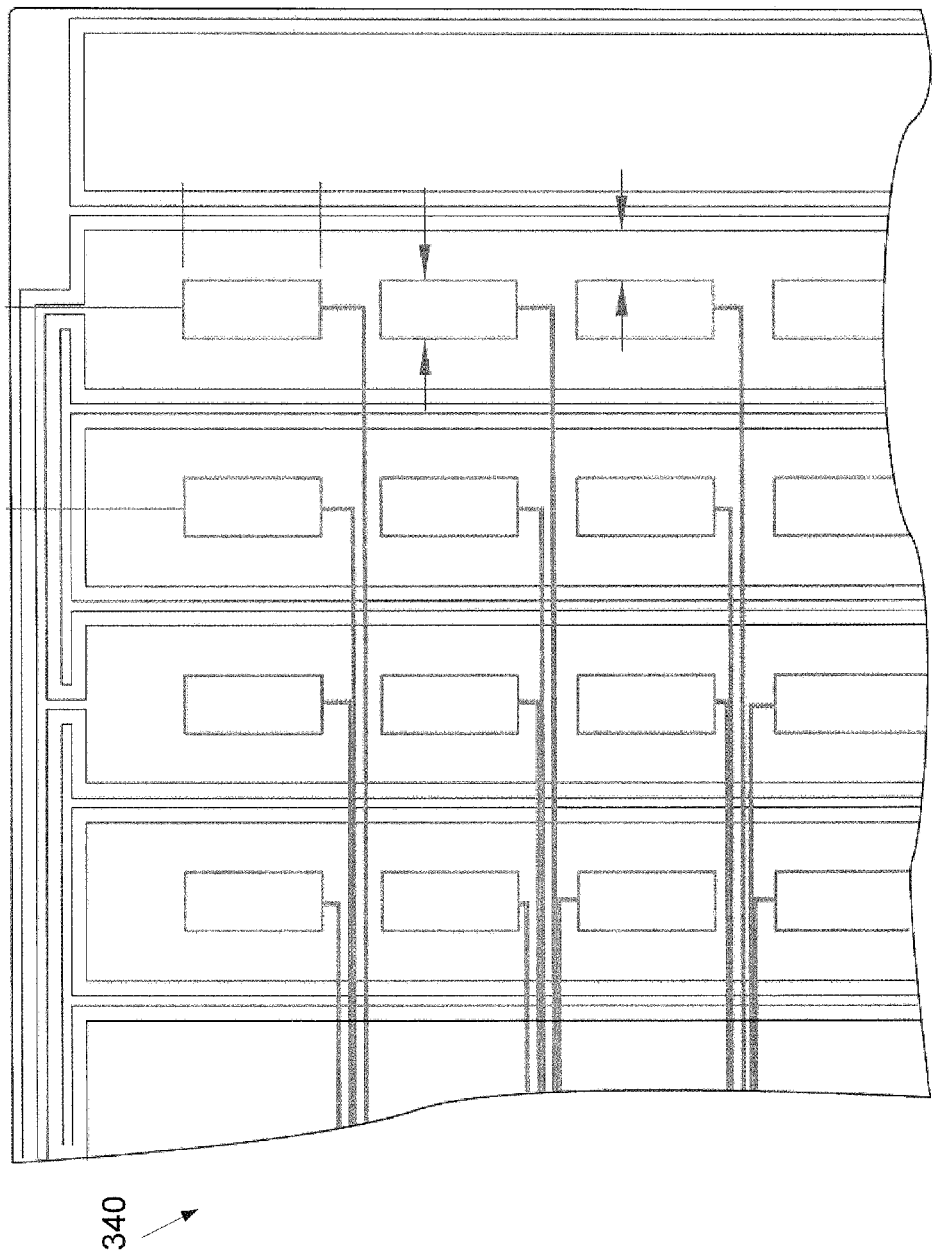

METHOD AND APPARATUS FOR LOAD AND ADDITIONAL PROPERTY MEASUREMENT

This application claims the benefit of U.S. Provisional Application No. 61/617,168, filed on Mar. 29, 2012.

The entire teachings of the above application are incorporated herein by reference.

BACKGROUND OF THE INVENTION

Critical fastener locations on aircraft platforms require regular inspection to verify that cracking, corrosion or other deleterious conditions are not present. Also, critical locations on other structures, such as bridges, piping systems, pipelines, railroad rails, at mounting locations for vessels, drive trains, pumps and other structures and facilities require either inspections for damage or operational variable monitoring. Operational variables of interest include temperature and stresses/loads at critical interfaces and at varied depths into materials near joints, mounts and at other critical locations.

Inspection can require disassembly to gain access to critical locations. This disassembly often requires extensive man-hours incurring costs and operational down time and often causing collateral damage. Because of these costs and the impact on readiness and availability, inspections are performed as infrequently as possible while maintaining an acceptable level of risk. Thus, by the time damage is detected, it is often after considerable damage has occurred and parts must be replaced rather than repaired. Also, most inspections require removal of protective coatings, insulation and neighboring structures. Since many of these coatings, insulation layers and critical structures where deposited or installed by the original equipment manufacturers or during large-scale production or maintenance events, the replacement of these coatings, insulation and structures after inspections is often performed at a substantially poorer level of quality than the original deposition or installation. Thus, it is the previous inspection locations that often become the most likely damage sites. For example, a component with a corrosion protection coating or a sealed enclosure that has been removed or unsealed but not replaced at the same quality level may allow the corrosive environment to interact with susceptible materials resulting in severe corrosion that impacts safety critical structures and is revealed during the next inspection. This may require the part to be retired and may represent a significant safety hazard.

If a corroded part does not exceed the establish damage limit, corrosion may be blended out and the part returned to service. Bolt holes with small cracks detected through inspection may be repaired by oversizing the hole and installing bushings. Regions away from holes may be repaired by simply blending the corrosion and then treating, priming, and painting the exposed metal or by using advanced methods such as cold spray to replace the lost metal and reinstate the material to its original structural integrity. Flat surfaces may be repaired by machining the surface flat and installing a shim to return the surface to its original shape, using an epoxy to fill blended and dimpled surfaces, or simply leaving the blended out divots and scooped out material as machined. These repairs are susceptible to water entrapment or intrusion that may lead to corrosion if not repaired properly. In many aerospace applications these corrosion-prone areas are where flight controls and gearbox mount feet attach, and the load path through these locations is critical for aircraft safety. This is also true in other structures and facilities common in refineries, rail cars and railroad rails, bridges, power plants, piping systems, and ship systems.

SUMMARY OF THE INVENTION

Aspects of the invention relate to a sensor clamped between two structural or other components of a material construct. The sensor may be an eddy current based sensor such as the MWM® or MWM-Array sensors available from JENTEK Sensors, Inc. (Waltham, Mass.). Immediately adjacent to the sensor may be material to which the sensor response has negligible sensitivity. For example, in the case of an eddy current sensor, the material may be a non-conducting and non-permeable material. After such an insensitive layer may be a foil material such as to have properties that the sensor is sensitive to. Again in the example of an eddy current sensor, the layer may be a conductive layer. Finally there may be a structural material of interest for which a property is to be measured. In some embodiments the sensor may be configured such that this "stack-up" exists on only one side of the sensor. In some other embodiments, a similar stack-up may be established on both sides of the sensor. The inclusion of the sensor between the two components may be facilitated by constructing a substantially planar sensor. For example, the thickness of the sensor may be substantially smaller than the height or width of the sensor.

As the sensor and components construct is "clamped" the insensitive material may be compressed such that the distance between the sensor and the foil layer is effectively reduced. The sensor may be configured to estimate the distance between the sensor and the conducting foil layer. This distance may be related to the clamping load.

One or more additional properties may also be measured. In some embodiments, the additional property relates to the structural material beyond the foil. The structural material may be "structural", for example, to an aircraft or other critical piece of machinery or a facility such as a pipe or vessel mount. The additional property may be related to a damage mode associated with the structural material or to degradation of an otherwise functional material such as a coating or temperature sensitive material. In some embodiments the additional property is material loss as may be caused by corrosion of the structural material. In another embodiment the additional property may be a crack in the structural material. In yet other embodiments, the additional property may be any of a gap distance, a layer thickness, a temperature, a stress, a degraded metallurgical or other material property, or an electrical property of the material. Any suitable additional property may be measured. In some embodiments the additional property of interest relates to a material or material layer further away from the sensor than the foil layer. In some embodiments the sensor is configured to allow multiple depths of penetration beyond the conducting foil layer to discern properties near the sensor and farther away, or in multiple layers of a structure or on an adjacent surface and the far side of a neighboring layer. In some embodiments the sensor may be mounted within a gasket to form a sensor gasket. The materials and configuration of the sensor gasket may provide a barrier to moisture ingress into the joint to prevent corrosion of the joint.

In an embodiment where an eddy current sensor, such as an MWM, is used, one or more "higher" frequency sensor excitation may be used to determine the properties of the foil and distance to the foil. As stated above the distance to the foil may be related to a load applied to the clamped structure in which the sensor has been embedded. One or more relatively "lower" frequency excitations may be used to determine the additional property of interest. In some embodiments, a segmented field sensor with two or more drive to sense gaps integrated into the sensor is used to improve the depth resolution of the acquired data and allow estimation of additional properties of the neighboring material or additional operational variables such as temperatures or loads that can be discerned from the sensor responses for multiple frequencies or multiple segments of the applied field as measured at multiple sensing elements properly placed relative to a drive conductor or for an alternative sensor construct.

In some embodiments, grid methods may be used to relate the sensor response (e.g., voltage, current, impedance) to the load and/or additional property of interest. In some embodiments the accuracy of the grid methods may be enhanced by assuming certain properties of the material stack up are known. For example, one or more properties of the foil may be accurately known such that the grid methods need to be used to provide an estimate of such properties from measurement.

One aspect relates to a sensor gasket, disposed between a first and second component, for measuring load and an additional property. The sensor gasket comprises a sensor layer comprising a sensor; first and second load sensitive layers disposed on opposite sides of the sensor layer, the load sensitive layers each having a thickness that varies with the load applied to the sensor gasket by the components; a first conductive layer adjacent to a side of the first load sensitive layer opposite the sensor layer; and a first spacer layer between and adjacent to the first conductive layer and the first component.

In some embodiments of the sensor gasket the second component is adjacent to the second load sensitive layer.

In some embodiments the sensor gasket further comprises a second conductive layer adjacent to a side of the second load sensitive layer opposite the sensor layer; and a second spacer layer between and adjacent to the second conductive layer and the second component. The corresponding layers on opposite sides of the sensor layer may be made of substantially identical materials and have substantially identical thicknesses.

In some embodiments of the sensor gasket the sensor is a eddy-current sensor. The additional property may be a property of the first component, and the eddy-current sensor, if operated at a first excitation frequency, may be substantially sensitive to the additional property and, if operated at a second excitation frequency higher than that first, may be substantially insensitive to the additional property. The additional property may be material loss from the first component.

In some embodiments of the sensor gasket the sensor gasket provides a barrier to moisture ingress between the first and second component.

Another aspect relates to a system for measuring load and an additional property of a component. The system comprises a load sensitive layer having a thickness that varies with the load applied to the component; a conductive layer adjacent to a first side of the load sensitive layer; a sensor layer comprising a sensor adjacent to a second side of the load sensitive layer; a spacer layer between and adjacent to the component and the conductive layer; and an instrument configured to operate the sensor in a first mode to measure a distance between the sensor and the conductive layer and relate said distance to the load on the component, and a second mode to measure the additional property of the component.

In some embodiments of the system the sensor is a eddy-current sensor. The instrument may be configured to operate the eddy-current sensor in the first mode at a first excitation frequency and to operate the eddy-current sensor in the second mode at a second excitation frequency, the second excitation frequency being a lower frequency than the first excitation frequency, and the eddy-current sensor, if operated in the first mode, may be substantially insensitive to the additional property. The additional property may be material loss from the component.

In some embodiments the system further comprises a second load sensitive layer, a second conductive layer, and a second spacer layer having a same configuration on an opposite side of the sensor layer, wherein the second spacer layer is adjacent to a second component.

In some embodiments of the system the load sensitive layer, conductive layer, sensor layer, and spacer layer have a hole to pass at least one fastener for the component.

In some embodiments of the system the load sensitive layer comprises a first load sensitive material layered upon a second load sensitive material, the first load sensitive material having a different elastic modulus than the second load sensitive material.

In some embodiments of the system the sensor layer is embedded within a gasket disposed in a joint between the component and a second component, the gasket configured to provide a barrier to moisture ingress into the joint.

Yet another aspect relates to a method of measuring load and an additional property from a layered sensor construct disposed between a first and second components. The method comprises acts of measuring a first response of a sensor within the layered sensor construct at a first excitation frequency; measuring a response of the sensor at a second excitation frequency, the second excitation frequency lower than the first excitation frequency; and operating a computer to (i) process at least the first sensor response to estimate a distance between the sensor and a conductive layer, the sensor and conductive layer separated by at least a load sensitive material; (ii) estimate the load on the first and second component from the distance; and (iii) process at least the second sensor response to estimate the additional property, the additional property being a property of at least one of the first and second components.

In some embodiments the distance between the sensor and the conductive layer is estimated first in time and said distance is assumed by the process to estimate the additional property.

In some embodiments the additional property is a temperature of the first component. In some embodiments the additional property is material loss of the first component.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3D-3G are illustrative embodiments of a thin layer sensor.

Figure 1:
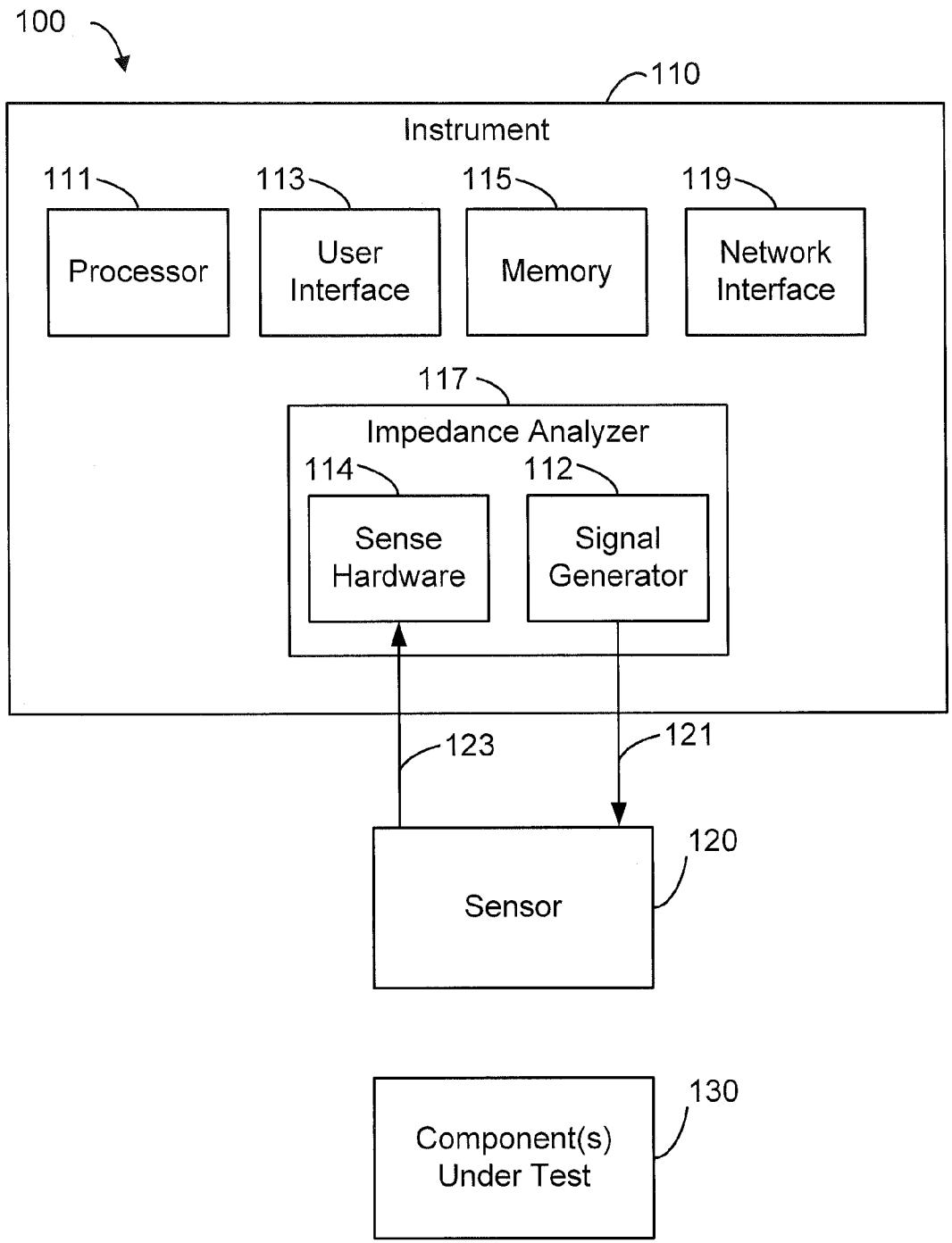
FIG. 1 is a block diagram of a measurement system according to some embodiments.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The inventors have recognized and appreciated the need for embedded load monitoring and structural health monitoring capability on critical structures. A sensor and sensing method is disclosed that provides simultaneous load and structural health monitoring.

Prior to discussing embodiments of the sensor itself, a system with which the sensor may be operated is presented. FIG. 1 shows a block diagram of a measurement system 100 for monitoring test object 130 with a sensor 120. Measurement system 100 includes an instrument 110 for exciting and measuring sensor 120. Instrument 110 is configured to provide excitation signals 121 to sensor 120 and measure the resulting response signals 123 of sensor 120. Measured response signals 123 may be processed to estimate properties of interest, such as electrical properties (e.g., conductivity, permeability, and permittivity), geometric properties (e.g., thickness, sensor lift-off), material condition, or any other suitable property or combination thereof. For composite layers or particle suspensions within layers the estimated properties might include fiber density, fiber conductivity, particle distribution density or particle properties, and matrix properties, all of which may vary with loads or temperature or environmental exposure. Composite layers may also be included to shield certain directional components of the drive field or other fields and to isolate the desired component of the applied field and improve sensitivity and selectivity of the response to the desired damage characteristic or operational variable to be monitored.

Instrument 110 may include a processor 111, a user interface 113, memory 115, an impedance analyzer 117, and a network interface 119. Though, in some embodiments, instrument 110 may include other combinations of components. While instrument 110 is drawn as a single block, it should be appreciated that instrument 110 may be physically realized as a single "box"; multiple, operably-connected "boxes", or in any other suitable way. For example, in some embodiments it may be desired to provide certain components of instrument 110 as proximal to sensor 120 as practical, while other components of instrument 110 may be located at greater distance from sensor 120. The components may be connected, for example, by wire or wirelessly.

Processor 111 may be configured to control instrument 110 and may be operatively connected to memory 115. Processor 111 may be any suitable processing device such as for example and not limitation, a central processing unit (CPU), digital signal processor (DSP), field programmable gate array (FPGA), controller, addressable controller, general or special purpose microprocessor, microcontroller, addressable microprocessor, programmable processor, programmable controller, dedicated processor, dedicated controller, or any suitable processing device. In some embodiments, processor 111 comprises one or more processors, for example, processor 111 may have multiple cores and/or be comprised of multiple microchips.

Memory 115 may be integrated into processor 111 and/or may include "off-chip" memory that may be accessible to processor 111, for example, via a memory bus (not shown). Memory 115 may store software modules that when executed by processor 111 perform desired functions. Memory 115 may be any suitable type of non-transient computer-readable storage medium such as, for example and not limitation, RAM, a nanotechnology-based memory, one or more floppy disks, compact disks, optical disks, volatile and non-volatile memory devices, magnetic tapes, flash memories, hard disk drive, circuit configurations in FPGAs, or other semiconductor devices, or other tangible, non-transient computer storage medium.

Instrument 110 may have one or more functional modules 109. Modules 109 may operate to perform specific functions such as processing and analyzing data. Modules 109 may be implemented in hardware, software, or any suitable combination thereof. Memory 115 of instrument 110 may store computer-executable software modules that contain computer-executable instructions. For example, one or more of modules 109 may be stored as computer-executable code in memory 115. These modules may be read for execution by processor 111. Though, this is just an illustrative embodiment and other storage locations and execution means are possible.

Instrument 110 may provide excitation signals for sensor 120 and measure the response signal from sensor 120 using impedance analyzer 117. Impedance analyzer 117 may contain a signal generator 112 for providing the excitation signal to sensor 120. Signal generator 112 may provide a suitable voltage and/or current waveform for driving sensor 120. For example, signal generator 112 may provide a sinusoidal signal at one or more selected frequencies, a pulse, a ramp, or any other suitable waveform.

Sense hardware 114 may comprise multiple sensing channels for processing multiple sensing element responses in parallel. Though, other configurations may be used. For example, sense hardware 114 may comprise multiplexing hardware to facilitate serial processing of the response of multiple sensing elements. Sense hardware 114 may measure sensor transimpedance for one or more excitation signals at on one or more sense elements of sensor 120. Instrument 110 may process the transimpedance data to estimate one or more properties of test object 130. It should be appreciated that while the sensor response may be represented by transimpedance (sometimes referred to simply as impedance), the way the sensor response is represented is not critical and any suitable representation may be used.

Sensor 120 may be an eddy-current sensor, dielectrometry sensor, ultrasonic sensor, magnetoresistive sensor, optical sensor, thermocouple, humidity sensor, or any other suitable type of sensor utilizing any suitable sensing technology or combination of sensing technologies.

In some embodiments, sensor 120 is a linear drive eddy-current sensor such as an MWM or MWM-Array available from JENTEK Sensors, Inc., Waltham, Mass. For example, sensor 120 may be a one-dimensional MWM-Array such as sensor 330 in FIG. 3D, a two-dimensional MWM-Array such as sensor 340 in FIG. 3E, or a rosette such as that shown as sensor 350 in FIG. 5F (see US Published Application No. 2011/0210724 published Sep. 1, 2011 which is herein incorporated by reference in its entirety). Though other sensor configurations may be used. For example, FIG. 5G shows a sensor 360 for monitoring load and at least one other property at a connection pad of an aircraft gearbox. Sensor 360 includes two 15 element one-dimension arrays and 10 rosette elements. Note that for clarity sensing element leads and some other features are not shown in FIG. 5G. In some embodiments multiple drive and sensing elements are included to monitor loads in multiple directions such as a bidirectional or quadridirectional magnetic stress gage described in U.S. Pat. No. 8,222,897 which is herein incorporated by reference in its entirety. Sensor 120 may be a segmented field sensor such as that disclosed in US Patent Publication No. 2006/0076952, published Apr. 13, 2006, and incorporated by reference in its entirety. These configurations of sensor 120 are exemplary and any suitable configurations may be used.

In another embodiment, sensor 120 is an interdigitated dielectrometry sensor or a segmented field dielectrometry sensor such as the IDED® sensors also available from JENTEK Sensors, Inc and described in U.S. Pat. No. 6,781,387 which is herein incorporated by reference in its entirety. Sensor 120 may have a single or multiple sensing and drive elements. Sensor 120 may be mounted on or embedded into test object 130.

In some embodiments, the computer-executable software modules may include a sensor data processing module, that when executed, estimates properties of test object 130. The sensor data processing module may utilize property grids stored in memory 115. The property grids are multi-dimensional pre-computed databases that relate one or more transimpedance measurements to properties to be estimated. The sensor data processing module may take the property grids and sensor data and, using grid methods, estimate material properties. Grid methods are described, for example, in U.S. Pat. No. 6,992,482 which is herein incorporated by reference in its entirety.

User interface 113 may include devices for interacting with a user. These devices may include, by way of example and not limitation, keypad, pointing device, camera, display, touch screen, audio input and audio output.

Network interface 119 may be any suitable combination of hardware and software configured to communicate over a network. For example, network interface 119 may be implemented as a network interface driver and a network interface card (NIC). The network interface driver may be configured to receive instructions from other components of instrument 110 to perform operations with the NIC. The NIC provides a wired and/or wireless connection to the network. The NIC is configured to generate and receive signals for communication over the network. In some embodiments, instrument 110 is distributed among a plurality of networked computing devices. Each computing device may have a network interface for communicating with other the other computing devices forming instrument 110.

Figure 2A:
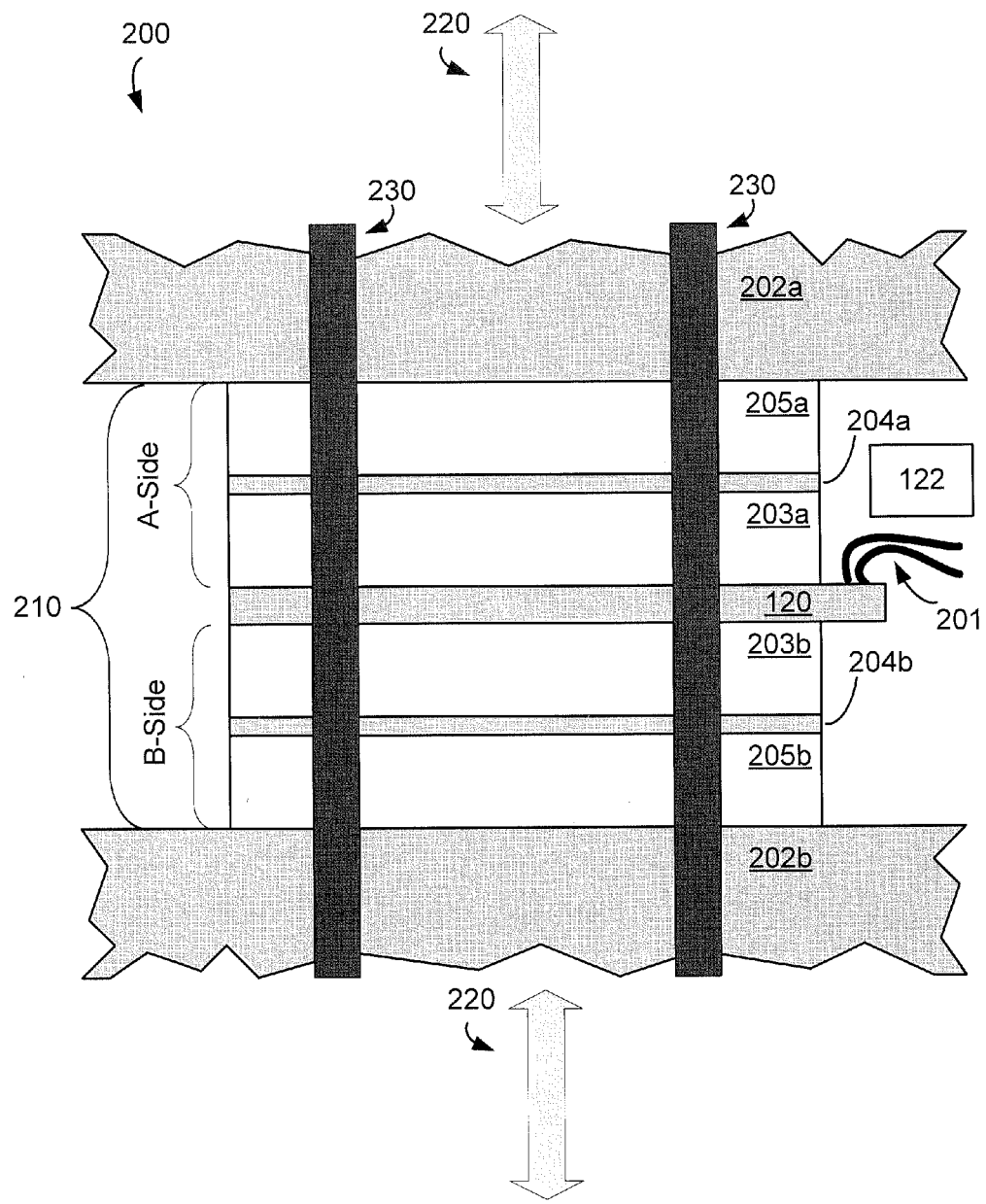
FIG. 2A is a sensor system disposed at a joint between a first and second component according to some embodiments.

FIG. 2A shows a cross-sectional view of an embodiment of a sensor system 200. Sensor system 200 includes a sensing gasket 210 which includes multiple layers. In some embodiments a "layer" is composed of one or more thin materials such that collectively one dimension is at least 10 times smaller than the other two dimensions. In some embodiments the thin direction of the layer may be at least 100 or at least 1,000 times smaller than the other two dimensions. One of the layers of sensor gasket 210 is sensor 120 (see also FIG. 1). All portions of sensor system 200 other than sensor 120 may be viewed as constituting test object 130 of measurement system 100. FIG. 2A is not necessarily shown to scale and the relative dimensions of the components may differ from those shown.

In some embodiments sensor 120 may extend as shown in FIG. 2A to permit on or more sensor leads 201 to connect to the sensor for sensor measurements. Sensor leads 201 may be connected to sensor 120 in any suitable way. For example, a suitable connector may be used, the leads may be hard wired, or another suitable form of wired or wireless communication may be used.

Sensor gasket 210 is disposed between components 202a and 202b. Components 202 may be structural components of an aircraft, bridge, maritime vessel, refinery, pipeline, or any other component to be monitored. For example, components 202 may be a connection pad and joint for an aircraft gearbox. Components 202 may be made of any suitable material. A component may be, for example, made of aluminum, titanium, nickel, magnesium, iron, alloys thereof, steel, carbon fiber, glass fiber, or other composites, or any other material or combination of materials. Components 202a and 202b may be made of the same or different materials. In some embodiments unidirectional or multi-directional composite fiber reinforced layups are used to shield or shape the transmitted field so that the sensor response is sensitive to desired adjacent material properties, such as a magnetic permeability variation with a selected loading direction, and less sensitive to other adjacent material properties, such as magnetic permeability variation with an orthogonal load direction.

In some embodiments sensor system 200 may include one or more additional sensors 122 which may be separate from sensor 120. Sensor 122 may be placed proximal to sensing gasket 210, embedded in sensing gasket 210, mounted on sensing gasket 210 or on one or both of components 202, or in any suitable location. Sensor 122 may be any suitable sensor such as any of the types of sensors discussed in connection with sensor 120. Sensor 122 may be used with measurement system 100 (FIG. 1) or measured in any other suitable way. Additional property measurements from sensor 121 may be used in estimating the load or one or more additional property measurements as discussed further in connection with method 300 (FIG. 3). For example, sensor 122 may be a temperature sensor used to estimate the properties of a temperature dependent layer.

Similarly, additional or alternative sensing modalities may be collocated with sensor 120 to provide additional information. For example, a wicking fiber network may be included in sensor gasket 210 to wick moisture into the sensitive region of sensor 120 allowing detection of moisture ingress. With or without the wicking fiber network proper selection of the non-conducting layer materials to be hydrophobic or hydrophilic can enhance or suppress the moisture monitoring capability of, for example, the dielectric sensing modality. In one embodiment both magnetic field, inductive, and electric field, capacitive or dielectric, sensing modalities are integrated into sensor 120 or sensor 122.

Components 202 and sensing gasket 210 may be held in place in part by one or more fasteners 230. Fasteners 230 may pass through one or more holes in sensing gasket 210 (as shown) or may be adjacent to sensing gasket 210. Though any suitable configuration may be used. Sensor gasket 210 may be made up of hydrophobic materials or have an exterior layer of hydrophobic material to prevent moisture ingress at the joint between components 202. Such preventative measures may reduce the rate of moisture induced deterioration such as corrosion.

In addition to sensor 120 sensing gasket 210 may include additional material layers. For example, load sensitive layers 203a and 203b may be adjacent to sensor 120. The thickness of load sensitive layers 203 may vary with an applied load 220. Applied load 220 may be a compressive or tensile load. Though, other types of loads may be applied to sensor system 220 (e.g., shear). The elastic modulus of the load sensitive layers 203 may be selected to allow the range of sensitivity of the sensor measured distance to the foil to be adjusted so that the sensor can measure loads in desired ranges. In some embodiments a load sensitive layer has multiple layers of material, each with a different elastic modulus. Accordingly, in a low load range the lowest elastic modulus material dominates the dimensional changes sensed by sensor 120, while at higher loads the higher and then higher elastic modulus layers take over and dominate the sensor response. This embodiment of stacked load sensitive layers allows the sensor gasket to provide load monitoring over a wide range of applied loads.

In one configuration the load sensitive layer is a magnetically permeable, but non-conducting material such as a ferrite. Such a material layer may enhance sensitivity to a desired effect but still allowing the sensor response to be differentiated from the response to a conducting layer.

The relationship between the thickness of load sensitive layers 203 and load 220 may be known or measured. In some embodiments, load sensitive layers 203 may be made of a non-conducting, non-permeable material such as a many polymers (e.g., a polyester film). Though, any suitable material may be used. In some embodiments a property of load sensitive layer other than thickness is load sensitive. For example, the permittivity, magnetic permeability or electrical conductivity may be load sensitive. Sensor 120 may be sensitive to the load sensitive property of load sensitive layers 203 such that a response of sensor 120 may be related to load 220. Similarly temperature sensitive layers or moisture sensitive layers or chemical sensitive layers or layers sensitive to other operational or environmental or alternative properties or parameters of interest may be included in the sensor construct, including the use of combinations of such layers or a palette format with varied layers adjacent to each other within a joint or between two material layers of a structure or other facility. Also, in some embodiments fibers may be used to extend the sensitivity of the sensor construct beyond its footprint. In one such embodiment conducting carbon fibers might be used to allow induced eddy currents to travel outside the sensor footprint increasing the footprint of load or temperature sensitivity. In another such embodiment, wicking fibers, such as threads, might be used to increase the footprint of moisture sensitivity of a dielectric sensor.

In the embodiment of sensor system 200 shown in FIG. 2A, load sensitive layers 203 are followed by conductive layers 204a and 204b. The materials and thicknesses thereof selected for load sensitive layers 203 and conductive layers 204 may be selected such that sensor 120 may be configured to be sensitive to the distance between the sensor and conductive layer 204. For example, in one embodiment each load sensitive layer 203 is a 0.010 in (0.254 mm) thick polyester film (under essentially no load) and each conducting layer 204 is a 0.001 in (25.4 μm) thick brass foil. Though, any suitable materials and thicknesses may be used.

Conductive layers 204 may be separated from structural components 202 by spacer layers 205a and 205b. Spacer layers 205 may be non-permeable, non-conducting materials. Though any suitable material may be used. In some embodiments spacer layer 205a and/or 205b may be thermally insulating layers.

The materials of sensor gasket 210 sandwiching sensor 120 and their geometric properties may be selected in any suitable way. In some embodiments, the A-side layers (i.e., load sensitive layer 203a, conductive layer 204a, and spacer layer 205a) are substantially identical to their B-side counterparts (i.e. layers 203b, 204b, and 205b). In other embodiments they differ. Substantially identical is used here to mean that swapping any two corresponding layers would not affect the measurement accuracy. The measurement response is not substantially affected if, for example, each layer meets the specification of the corresponding layer on the opposite side of the sensor layer.

Figure 2B:
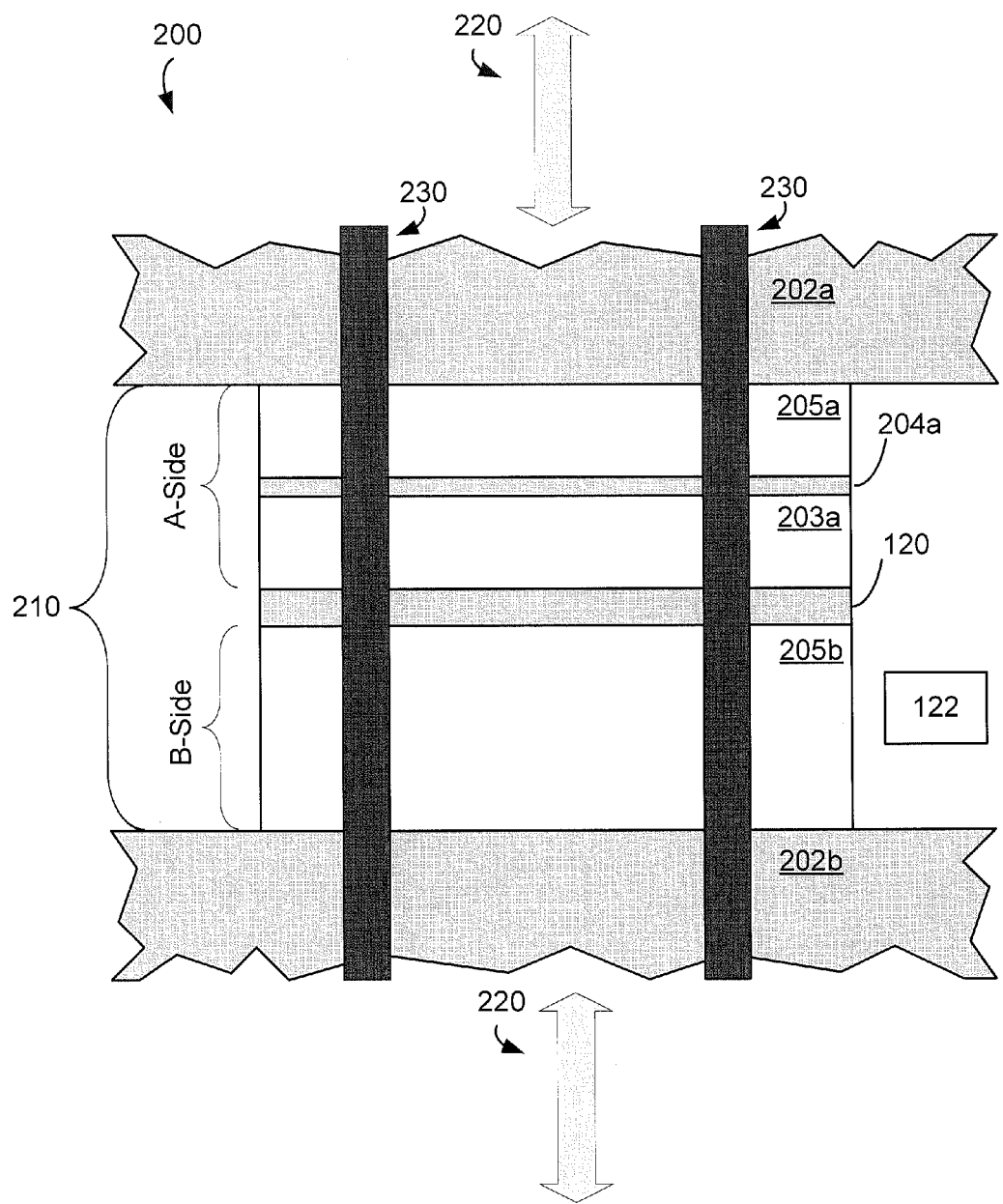
FIG. 2B is another sensor system disposed at a joint between a first and second component according to some embodiments.

FIG. 2B shows another embodiment of sensor system 200. In this example only the A-side has a conductive layer.

Figure 2C:
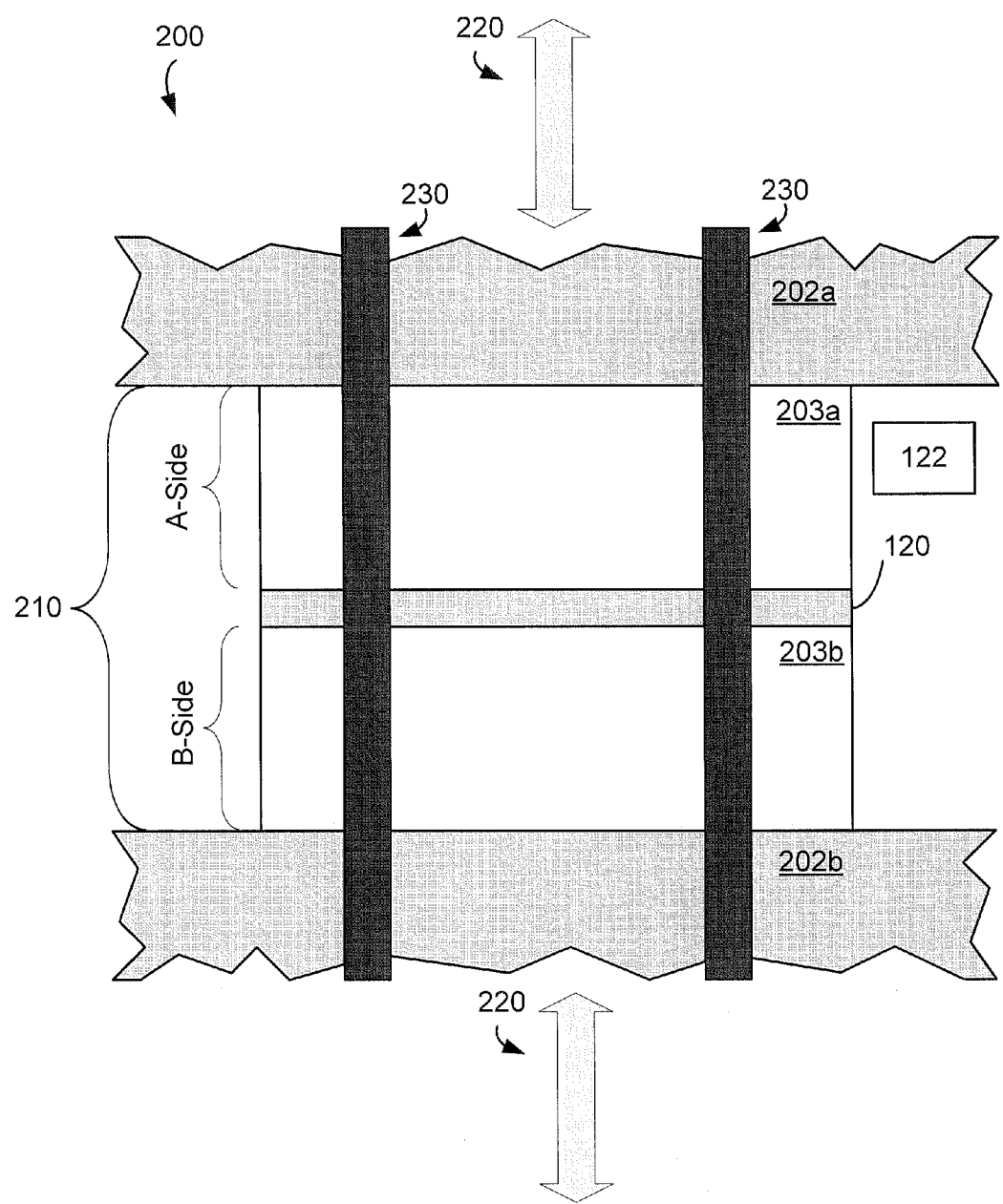
FIG. 2C is yet another sensor system disposed at a joint between a first and second component according to some embodiments.

FIG. 2C shows yet another embodiment of sensor system 200. In this example neither side has the conducting layer present.

It should be appreciated that the embodiments of sensor system 200 shown in FIGS. 2A-2C are exemplary and other configurations are possible. For example, greater or fewer layers may be present, sensor 120 may be distributed over multiple layers with intervening non-sensor layers and still other configurations are envisioned.

Figure 3A:
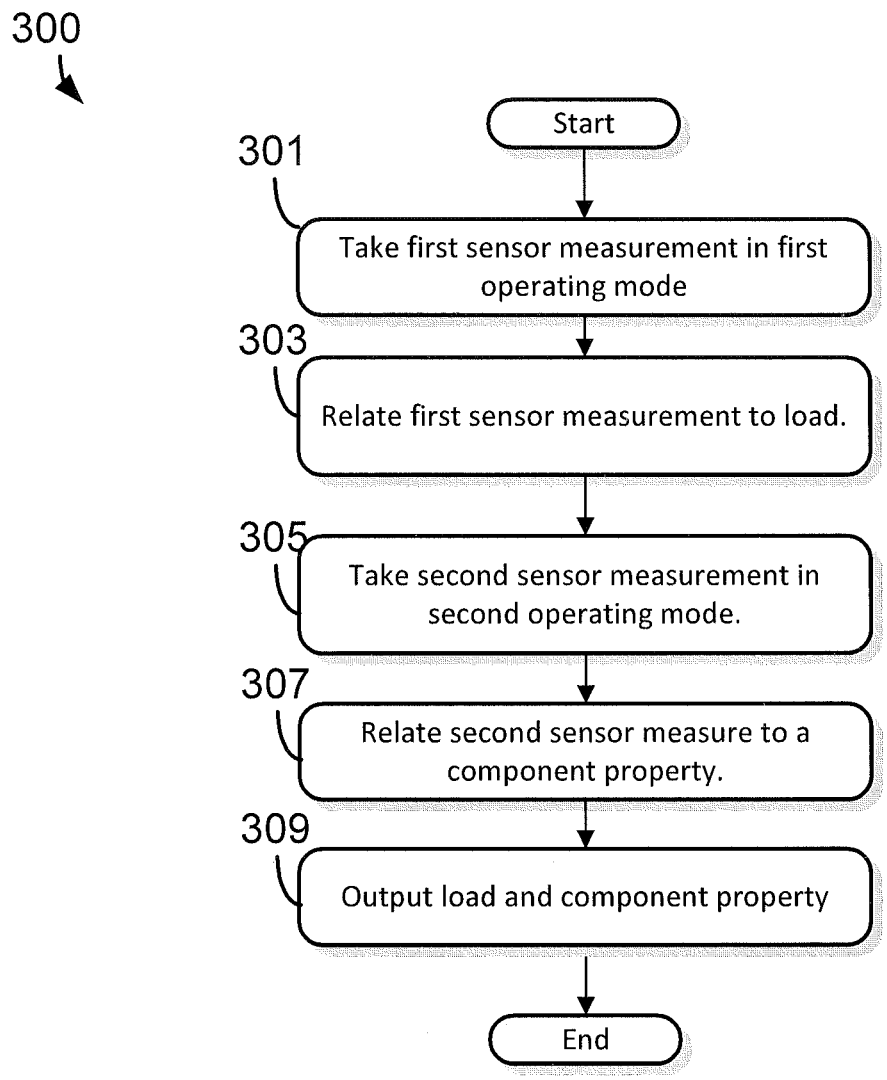
FIG. 3A is a flow diagram of a method of measuring load and an additional property according to some embodiments.

Attention is now turned to FIG. 3A which shows a flow diagram of a method 300 for operating a measurement system. In some embodiments the system is measurement system 100 shown in FIG. 1. The sensor and test object may be as shown, for example, in sensor system 200 shown in FIG. 2A, 2B, or 2C. Though any suitable measurement system may be used.

At step 301 a sensor of the measurement system is excited and measured in a first mode. The response is the "first sensor measurement" and is dependent upon the thickness of a load sensitive layer, or the load sensitive property, if other than thickness. In some embodiments the first sensor measurement is insensitive to the additional property. However, the measurement may be sensitive to both the load and the additional property. In some embodiments, the sensor has an array of sensing elements and monitors varied loads at multiple locations within a joint or other material construct.

In one embodiment the first mode is a high-frequency excitation mode (and the second mode is a low-frequency excitation mode). In another embodiment the first mode corresponds with a short spatial wavelength of the sensor (and the second mode corresponds to a long spatial wavelength of the sensor). The first mode may be achieved, for example, by selecting a sensor and excitation frequency such that the sensor is insensitive to the thickness of conductive layer 204 and insensitive to the materials beyond conductive layer 204 (e.g., spacer layer 205, components 202). In some embodiments the first sensor measurement obtained at step 301 is a raw sensor measurements and not a direct measurement of a load.

Figure 3B:
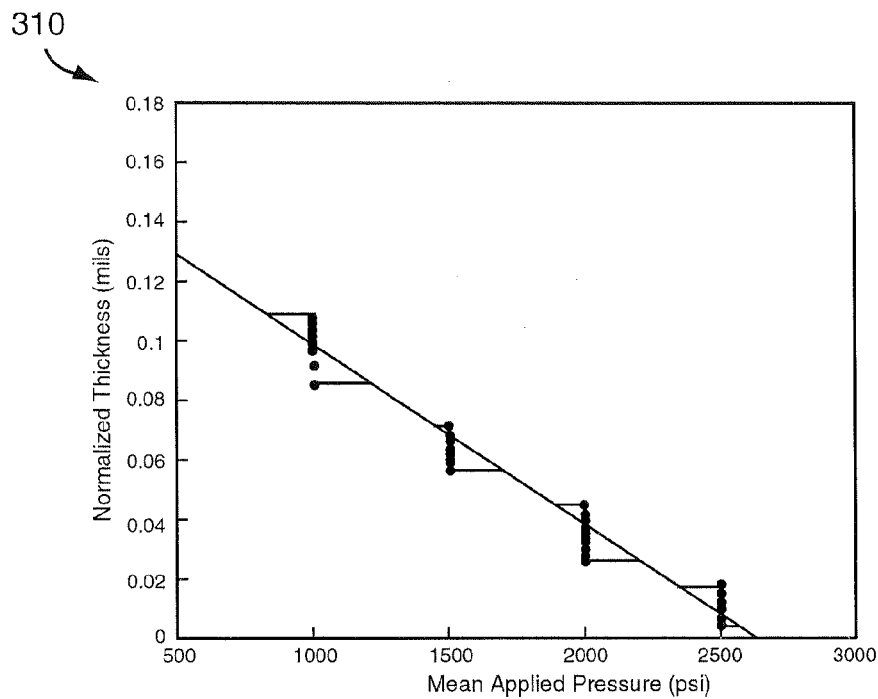
FIG. 3B is a plot illustrating a relationship between a sensor-conductive layer distance and the load applied at the first and second component joint according to some embodiments.
Figure 3C:
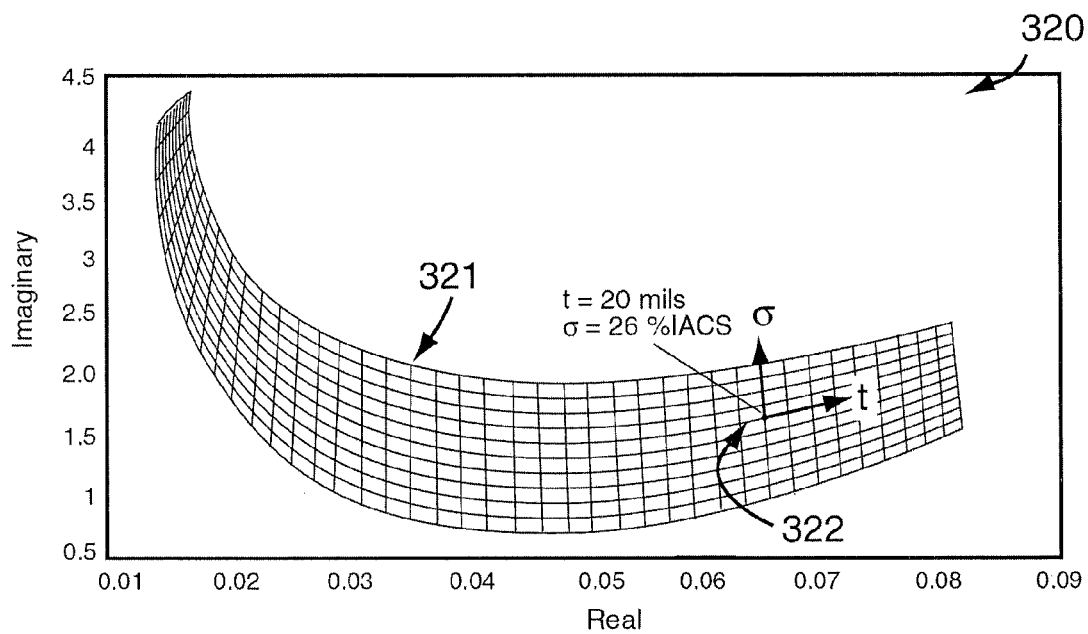
FIG. 3C is a plot of a measurement grid for relating a sensor impedance measurement to the sensor-conductive layer distance and the conductive layer conductivity according to some embodiments.

At step 303 the first sensor measurement is used to estimate the load. In some embodiments the sensor is part of sensor gasket 210 and the load is load 220 applied to the sensor system 200 (FIG. 2A). The relationship between the first sensor measurement and the load may be determined analytically, empirically or in any suitable way. For example, Plot 310 of FIG. 3B shows an best fit linear relationship between the applied load and the thickness of a load sensitive layer (e.g., load sensitive layers 203, FIG. 2) based on empirical data.

The raw sensor measurements may be processed to estimate the load, for example, by relating the raw sensor measurement directly to the load or to an intermediate property which is in turn related to the load. The relationship between the raw sensor measurement and the property (or intermediate property) may be determined using an analytical model, an empirical model, a database, look-up table, or any other suitable technique or combination of techniques.

In some embodiments the raw measurement is a sensor transimpedance measurement. The transimpedance may be related to the property of interest using the grid methods. For example, the first sensor measurement may be a transimpedance measurement that is related to the distance from the sensor to the conductive layer using a measurement grid as shown in plot 320 of FIG. 3C (described below). Once the intermediate property of distance, is estimated using the grid database, the load may be estimated using an empirical relationship such as that shown in plot 310 of FIG. 3B.

Figure 3D:
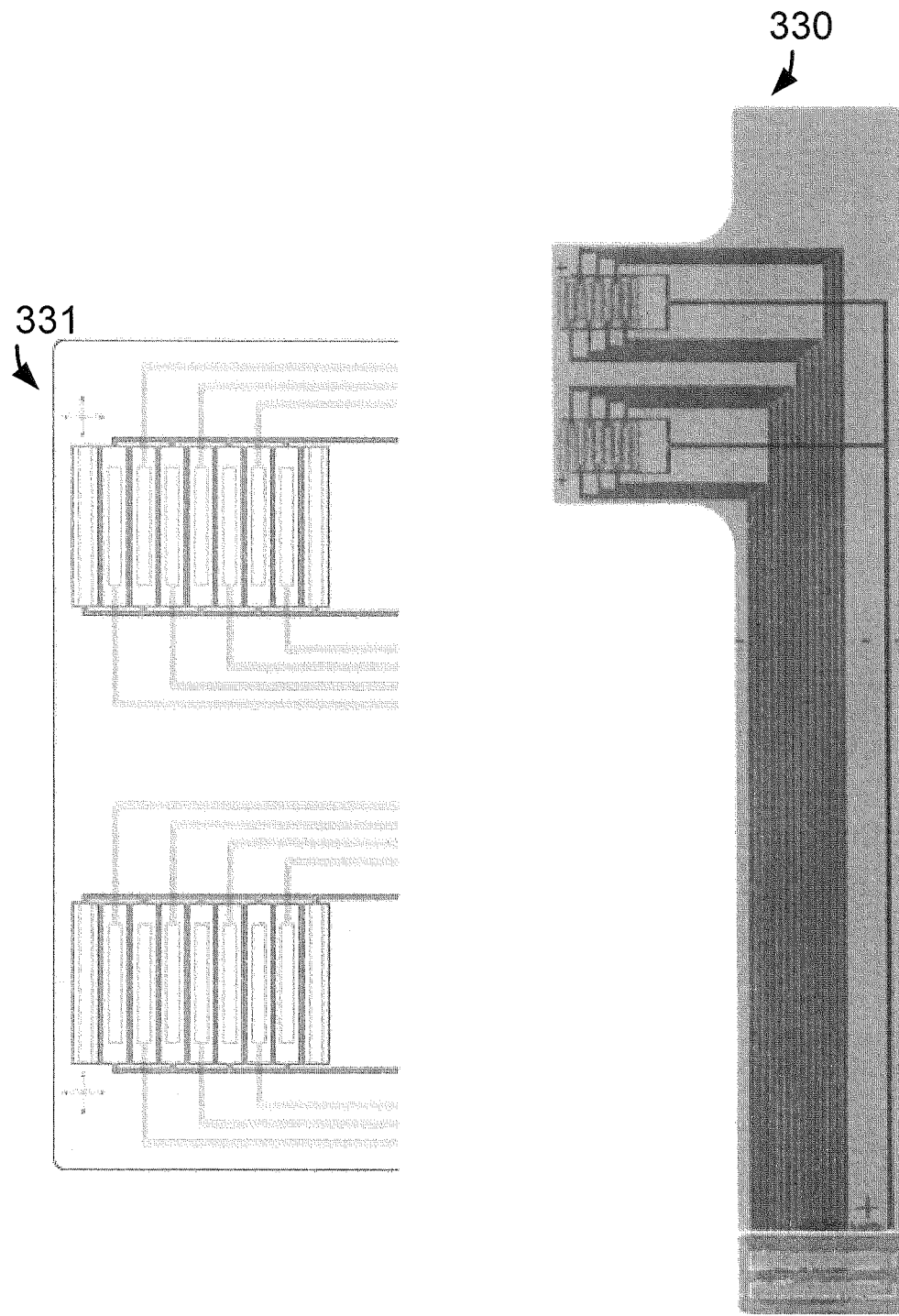
Figure 3F:
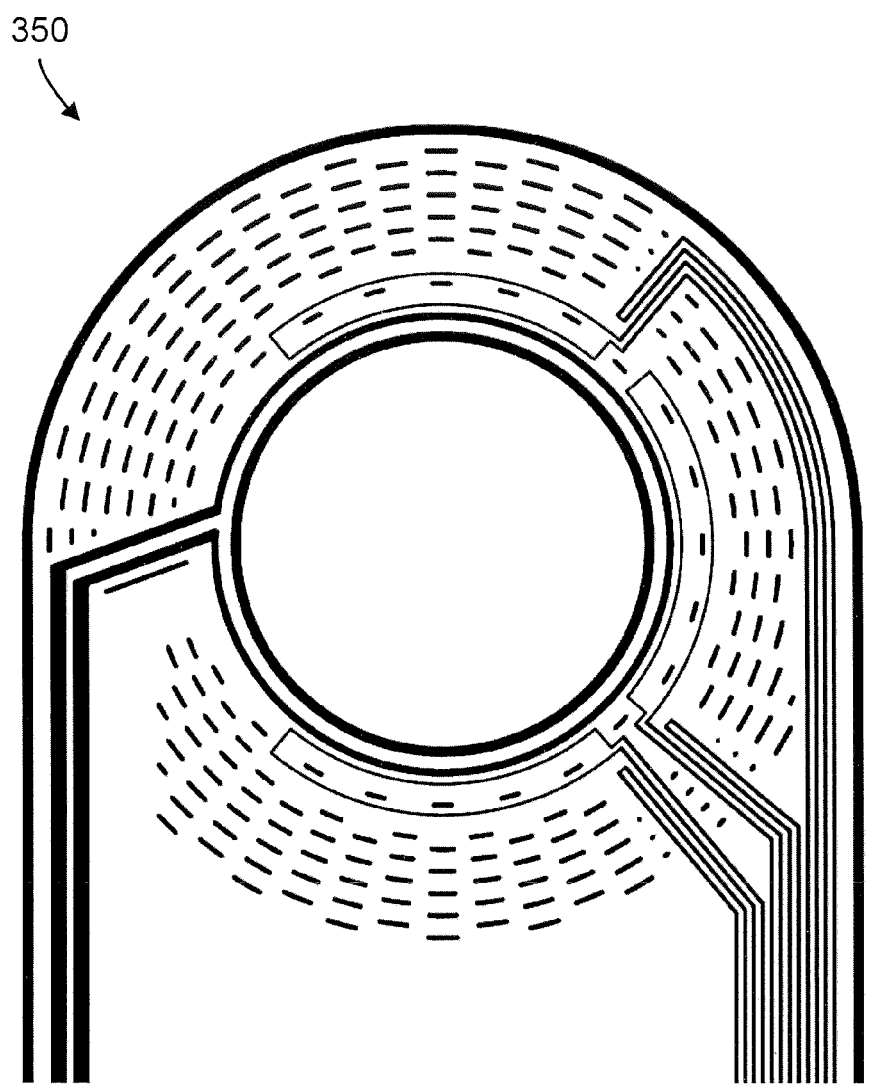
Figure 3G:
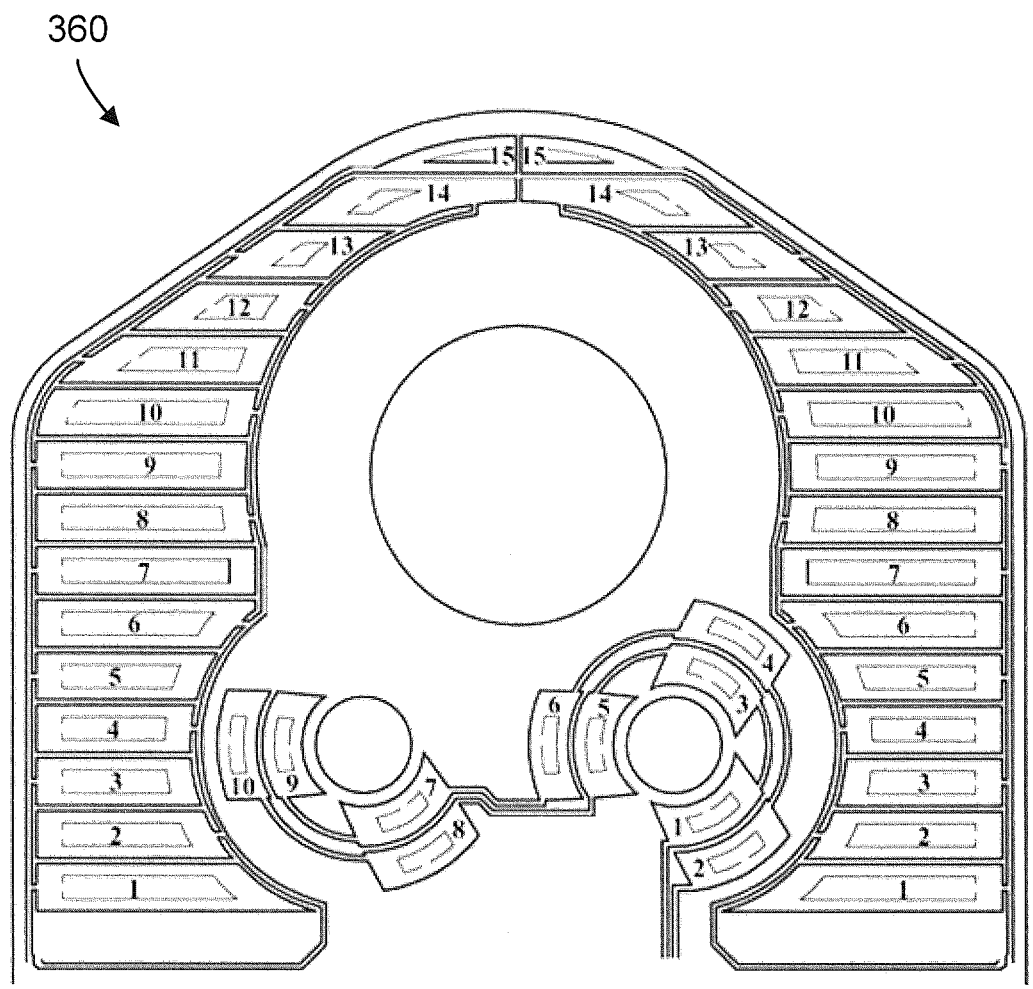

Plot 320 shows a conductivity-thickness measurement grid where sensor 120 in FIG. 2A is an FA104 MWM-Array (sensor 330, FIG. 3D). In plot 320 the conductivity, σ, of conductive layers 204 are assumed to be equal as is the thickness, t, of the two load sensitive layers 203. Location 322 on grid 321 corresponds to nominal properties where a brass foil is used for conductive layers 204 and 0.010 inch (10 mil) thick polyester films are used as load sensitive layers 203. Grid 321 spans a range of thickness from 0.5 to 25 mils (representing the sum of the thicknesses of the two load sensitive layers 203) and a wide range of conductivity from 20% IACS to 30% IACS. During measurements at loads from 500 to 2,500 psi, thickness changes are typically less than 0.25 mils. The conductivity was generally stable within +/−0.25% IACS during experiments.

At step 305 a sensor of the measurement system is excited and measured in a second mode. The second mode may suitably isolate sensitivity to a property of interest of the component. For example, in sensor system 200 of FIG. 2 the second mode may be sensitive to material loss of component 202a and/or component 202b due to corrosion or another degradation mechanism. The second mode may be achieved by providing a low-frequency excitation to a suitable sensor (such that the drive signal penetrates through all intermediate layers between the sensor and the component.

At step 307 the second sensor measurement is related to the property of the component that is of interest. The component property of interest may be corrosion, cracking, gap distance, a layer thickness, a temperature, a stress, an electrical property of the material, or any other suitable property. Similar techniques, such as the grid methods, described in connection with step 303 may be used to relate the second sensor measurement to the component property of interest. Though the component property of interest may be determined from the second sensor measurement in any suitable way. In some embodiments properties that may have been estimated in connection with step 303 such as the distance between the sensor and the conductive layer and/or the conductive layer conductivity may be assumed in evaluation at step 307. Other properties that are sufficiently stable may also be assumed in this evaluation. For example, any thickness variation of the conductive layer may be sufficiently small that the conductive layer thickness may be assumed based on a previous measurement.

At step 309 the load and property measurements are output from the measurement system. For example the results may be presented on a user interface device, recorded on a storage medium, provided for further processing, or output in any suitable way.

It should be appreciated that the steps in method 300 are exemplary and the measurement system may be used in any suitable way to provide measurement of the load and at least one additional property. Steps may be performed simultaneously, continuously, and/or independently of one another.

In one embodiment the first mode and second mode excitations of the sensor are performed simultaneously. This may be achieved, for example, by exciting two excitation frequencies simultaneously. In another embodiment different sensor geometries are used to excite the first and second modes. For example, a segmented field sensor may be used. In another embodiment two sensors with different drive winding orientations are excited simultaneously and sensing elements are located to separately respond to the two different drive windings while minimizing sensitivity to the other drive orientation.

In some embodiments both the first and second measurement are sensitive to both the load and the additional property of interest. Steps 305 and 307 may be performed, at least in part, simultaneously to permit estimation of both load and the additional property.

It should be appreciated that while in the embodiments described the thickness of the load sensitive layer was load dependent, other properties of such layer may be load dependent. For example, the permittivity, magnetic permeability or electrical conductivity of the layer may be load dependent and the sensor may be configured in the first mode to measure the load dependent property.

In one embodiment, the thin foil layer is embedded between a support and a functional element where the foil provides both operational and damage monitoring function. In one such embodiment the foil is monitoring operational stress and corrosion associated wall loss. In another, the foil is monitoring operation temperature and crack initiation and growth.

In one embodiment the thin foil layer provides monitoring of two or more operational variables. For example, temperature and load on a structure adjacent to the foil. In this embodiment the distance to the foil is used to monitor the load and the conductivity of the foil provides the foil temperature, while a lower frequency is used of measure the properties of the adjacent material.

In one embodiment the adjacent construct might have one or multiple layers. The thin sensor in this embodiment can monitor load by measuring the distance to the conductive layer, and monitor the first adjacent layer conductivity to determine its temperature and then measure a more distant layer conductivity as well using multiple frequencies to measure the temperature of the distant layer while correcting for the temperature of the intermediate layer. In one such embodiment these layers may be the near surface region and a deeper region within the same layer of material such as a pipeline wall or a vessel wall. In this embodiment the goal might be to measure the temperature inside the pipeline while correcting for a temperature gradiant from the outside to the inside of the pipeline using the sensor construct mounted between the pipeline and an adjacent structure.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, an embedded computer in an alternative customized case with a touch screen, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A sensor gasket, disposed between a first and second component, for measuring load and an additional property, the sensor gasket comprising:
a sensor layer comprising a sensor;
first and second load sensitive layers disposed on opposite sides of the sensor layer, the load sensitive layers each having a thickness that varies with the load applied to the sensor gasket by the components;
a first conductive layer adjacent to a side of the first load sensitive layer opposite the sensor layer; and
a first spacer layer between and adjacent to the first conductive layer and the first component.

2. The sensor gasket of claim 1 wherein the second component is adjacent to the second load sensitive layer.

3. The sensor gasket of claim 1 further comprising:
a second conductive layer adjacent to a side of the second load sensitive layer opposite the sensor layer; and
a second spacer layer between and adjacent to the second conductive layer and the second component.

4. The sensor gasket of claim 3, wherein corresponding layers on opposite sides of the sensor layer are made of substantially identical materials and have substantially identical thicknesses.

5. The sensor gasket of claim 1, wherein the sensor is a eddy-current sensor.

6. The sensor gasket of claim 5, wherein
the additional property is a property of the first component, and
the eddy-current sensor, if operated at a first excitation frequency, is substantially sensitive to the additional property and, if operated at a second excitation frequency higher than that first, is substantially insensitive to the additional property.

7. The sensor gasket of claim 6, wherein the additional property is material loss from the first component.

8. The sensor gasket of claim 1, wherein the sensor gasket provides a barrier to moisture ingress between the first and second component.

9. A system for measuring load and an additional property of a component, the system comprising:
a load sensitive layer having a thickness that varies with the load applied to the component;
a conductive layer adjacent to a first side of the load sensitive layer;
a sensor layer comprising a sensor adjacent to a second side of the load sensitive layer;
a spacer layer between and adjacent to the component and the conductive layer; and
an instrument configured to operate the sensor in a first mode to measure a distance between the sensor and the conductive layer and relate said distance to the load on the component, and a second mode to measure the additional property of the component.

10. The system of claim 9 wherein the sensor is a eddy-current sensor.

11. The system of claim 10 wherein
the instrument is configured to operate the eddy-current sensor in the first mode at a first excitation frequency and to operate the eddy-current sensor in the second mode at a second excitation frequency, the second excitation frequency being a lower frequency than the first excitation frequency, and
the eddy-current sensor, if operated in the first mode, is substantially insensitive to the additional property.

12. The system of claim 11, wherein the additional property is material loss from the component.

13. The system of claim 9, further comprising a second load sensitive layer, a second conductive layer, and a second spacer layer having a same configuration on an opposite side of the sensor layer, wherein the second spacer layer is adjacent to a second component.

14. The system of claim 9, wherein the load sensitive layer, conductive layer, sensor layer, and spacer layer have a hole to pass at least one fastener for the component.

15. The system of claim 9, wherein the load sensitive layer comprises a first load sensitive material layered upon a second load sensitive material, the first load sensitive material having a different elastic modulus than the second load sensitive material.

16. The system of claim 9, wherein the sensor layer is embedded within a gasket disposed in a joint between the component and a second component, the gasket configured to provide a barrier to moisture ingress into the joint.

17. A method of measuring load and an additional property from a layered sensor construct disposed between a first and second components, the method comprising acts of:
measuring a first response of a sensor within the layered sensor construct at a first excitation frequency;
measuring a response of the sensor at a second excitation frequency, the second excitation frequency lower than the first excitation frequency; and
operating a computer to
process at least the first sensor response to estimate a distance between the sensor and a conductive layer, the sensor and conductive layer separated by at least a load sensitive material;
estimate the load on the first and second component from the distance; and
process at least the second sensor response to estimate the additional property, the additional property being a property of at least one of the first and second components.

18. The method of claim 17, wherein the distance between the sensor and the conductive layer is estimated first in time and said distance is assumed by the process to estimate the additional property.

19. The method of claim 17, wherein the additional property is a temperature of the first component.

20. The method of claim 17, wherein the additional property is material loss of the first component.

* * * * *